United States Patent [19]

Patry

[11] 4,393,918
[45] Jul. 19, 1983

[54] MELTING LATENT-HEAT HEAT OR COLD EXCHANGER-STORAGE DEVICE

[76] Inventor: Jean Patry, 9, rue Saint-Paul, Paris, France, 75004

[21] Appl. No.: 312,845

[22] Filed: Oct. 19, 1981

[51] Int. Cl.³ ............................................. F28D 17/00
[52] U.S. Cl. .................................. 165/10; 165/104.11
[58] Field of Search .............................. 165/10, 104.11

[56] References Cited

U.S. PATENT DOCUMENTS

| | | | |
|---|---|---|---|
| 3,029,596 | 4/1962 | Hanold et al. ..................... | 165/10 X |
| 3,773,031 | 11/1973 | Laing et al. ........................ | 165/10 X |
| 3,960,207 | 6/1976 | Boer ..................................... | 165/10 |
| 4,104,185 | 8/1978 | Schroder ........................... | 165/10 X |
| 4,283,925 | 8/1981 | Wildfeuer .......................... | 165/10 X |

FOREIGN PATENT DOCUMENTS

| | | | |
|---|---|---|---|
| 2552698 | 6/1977 | Fed. Rep. of Germany ........ | 165/10 |
| 54-25550 | 2/1979 | Japan ..................................... | 165/10 |

*Primary Examiner*—Albert W. Davis, Jr.

*Attorney, Agent, or Firm*—Wenderoth, Lind & Ponack

[57] ABSTRACT

A heat or cold exchanger and storage device comprises a main container of elongated configuration, divided into two chambers by a longitudinal partition and provided at either end with a perforated plate. The two chambers communicate with each other at an end opposite an inlet and outlet end, so that an cold or heat carrier medium circulates in countercurrent relationship in the two chambers. A relatively great number of elementary containers are stacked in the two chambers. These elementary containers are so shaped as to provide a free gap therebetween, when stacked, to permit the circulation of the carrier medium, and each elementary container has an air pocket therein to permit the expansion of the complete assembly. Preferably each elementary container consists of a pair of substantially semi-spherical halves providing, in their assembled condition, a gap between the self-stacking elementary containers enclosed in the main container.

7 Claims, 7 Drawing Figures

MELTING LATENT-HEAT HEAT OR COLD EXCHANGER-STORAGE DEVICE

BACKGROUND OF THE INVENTION

The present invention relates to devices operating according to the melting latent-heat principle for exchanging and/or storing heat and/or cold. A device of this character is intended more particularly for plants requiring the implementation of means for producing heat or cold in variable quantities within a predetermined time period, notably for the purpose of reducing very appreciably the power rating of the heat- and/or cold producing apparatus.

Reference may be made to French Pat. No. 79 28 315, filed on Nov. 16, 1979, by the same applicant, which discloses a system of this type. As a rule, this apparatus requires means for storing the heat and/or cold thus produced, and thus keep them available for a subsequent use as a function of momentary requirements. The storage capacity of the apparatus is usually selected to enable the plant to deliver instantaneously the maximum instantaneous power (heat or cold) required by the plant loads.

SUMMARY OF THE INVENTION

Consequently, this invention is directed to providing a melting latent-heat heat or cold exchanger and storage device comprising two sections:

(a) a preferably cylindrical main container divided into two chambers by a longitudinal partition and provided, on the one hand, with an inlet aperture for introducing a heat carrier or transfer medium into one of the chambers, and, on the other hand, with an outlet aperture for delivering the heat carrier or transfer medium and which opens into the other chamber so that the carrier medium circulates in counter-current relationship through the chambers.

(b) a plurality of elementary containers stacked in each one of the two chambers and filled with a cold and/or heat storage medium having a relatively high melting latent heat value.

According to an essential feature characterizing this invention, the cylindrical container comprises, at either end, a perforated plate formed with apertures such as holes or slots, adapted to convert the static pressure of the heat carrier into a dynamic pressure as it penetrates into the respective chamber, in order to ensure a homogeneous distribution of the carrier medium throughout the exchanger.

According to another feature characterizing this invention, each elementary container, consisting for example of a rectangular parallelepipedic body, comprises, on each one of its major faces, a number of bosses such that, when the elementary containers are stacked in the exchanger, free gaps are left to permit the free circulation therethrough of the carrier medium.

BRIEF DESCRIPTION OF THE DRAWINGS

Other features and advantages of the present invention will appear as the following description proceeds, with reference to the attached drawings illustrating diagrammatically, by way of example, various embodiments of the invention, and wherein.

DETAILED DESCRIPTION OF THE INVENTION

Figure 1:
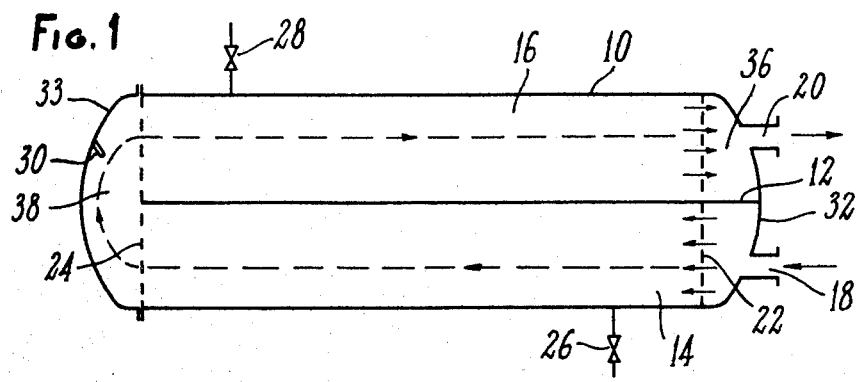
FIG. 1 is a diagrammatic longitudinal section showing a heat or cold exchanger and storage unit constructed according to the teachings of this invention.
Figure 2:
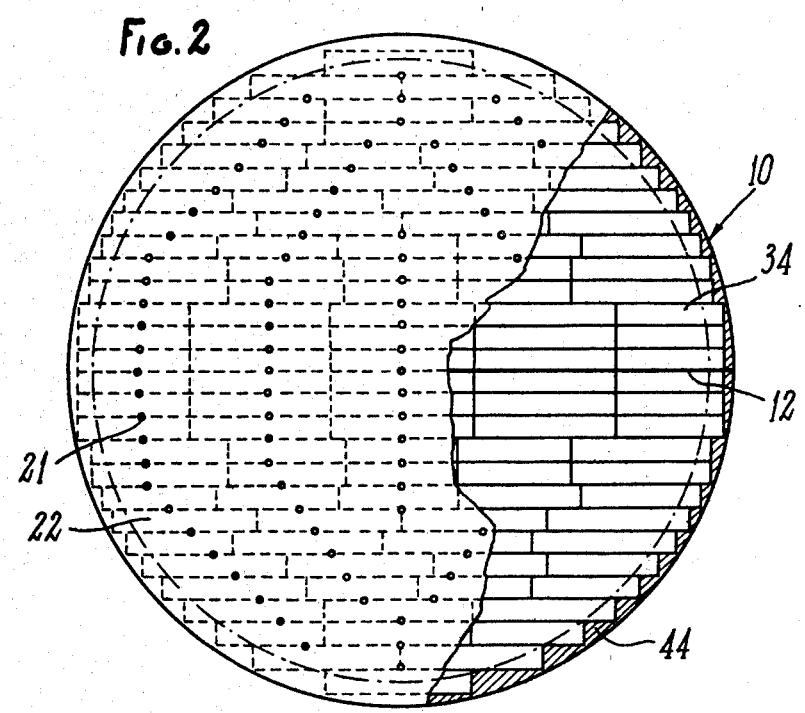
FIG. 2 is an end view, with parts broken away, showing on a larger scale the structure of the exchanger of FIG. 1.

Referring to the drawings, and more particularly to FIGS. 1 and 2, the exchanger and storage device of the present invention comprises a main container 10, preferably of cylindrical configuration in order to improve its resistance to service pressures. The inner space of this container 10 is divided into two chambers 14 and 16 by a longitudinal partition 12. At either end, the container 10 is provided with water-boxes 36, 38, consisting of bulged bottoms or end walls 32 and 33, respectively. The bulged bottom 33 is detachable, to permit an easy access to the inner space of the cylindrical body constituting the exchanger 10. The opposite bulged bottom 32 includes inlet and outlet pipes 18, 20, respectively, for the heat and/or cold carrier medium. As clearly shown in FIG. 1, the inlet pipe 18 opens into one chamber 14, and the outlet pipe 20 opens into the other chamber 16. With this arrangement, the heat or cold carrier medium circulates in counter-current relationship in chambers 14 and 16 of exchanger 10, thus following the path shown in dotted lines in FIG. 1.

Figure 6:
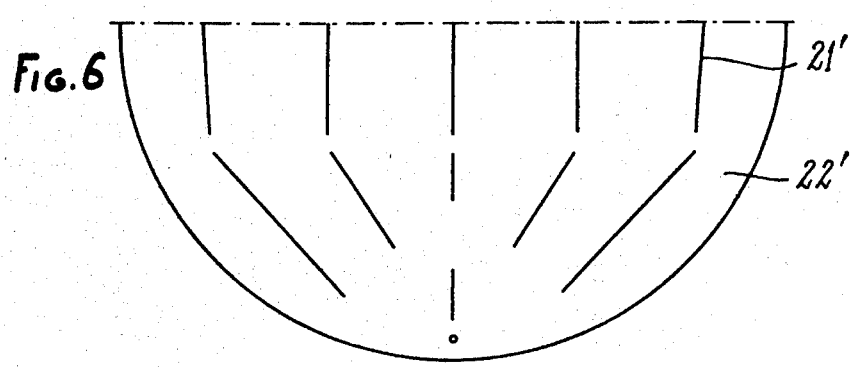
FIG. 6 is a diagrammatic view showing details of the assembly shown in FIG. 2; and, FIG. 7 illustrates a modified embodiment of an elementary container.

At either end of the cylindrical body of exchanger 10, an inner pair of circular perforated plates 22, 24 are provided. The function of these plates is, on the one hand, to retain within the exchanger stacks of elementary containers 34, to be described presently, and, on the other hand, to create a considerable resistance counteracting the circulation of the carrier medium in comparison with the inherent resistance created by the other component elements of the circuit through which this medium is caused to flow, thus ensuring a homogeneous distribution of the carrier medium throughout the exchanger. In fact, the perforations of plates 22 and 24 convert the static pressure of the carrier medium, in water boxes 36 and 38, into a dynamic pressure in each chamber 14, 16. The apertures formed through these circular plates 22 and 24 may consist either of holes 21 (plate 22, FIG. 2), or slots 21' (plate 22', FIG. 6). The storage and exchanger assembly further comprises a drain valve 26, a blow-off cock 28 and a thermometric probe 30.

In each chamber 14, 16 of the exchanger and storage device 10, elementary containers 34 are stacked to constitute a plate exchanger, as shown in FIG. 2.

Figure 3:
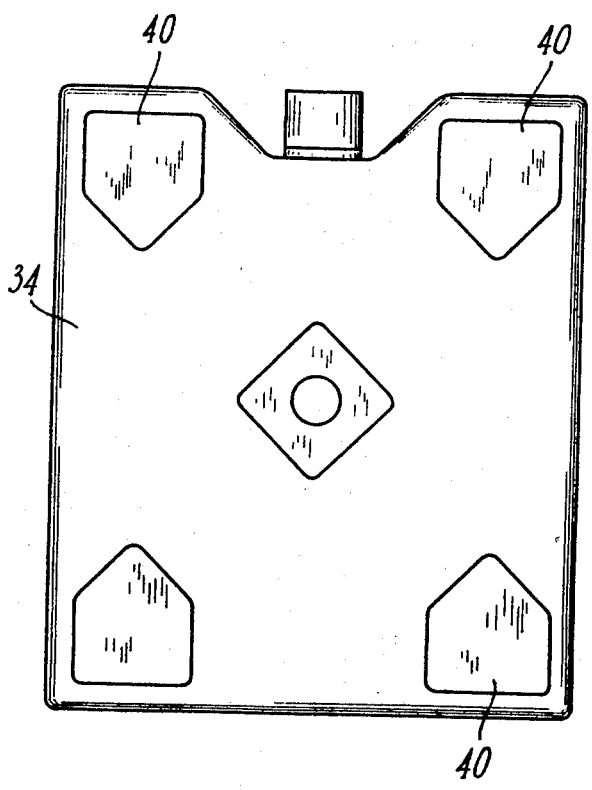
FIGS. 3 to 5 illustrate, in plan view, side elevational view and end view, respectively, a typical example of an elementary container of the type incorporated in the storage device of this invention.
Figure 5:
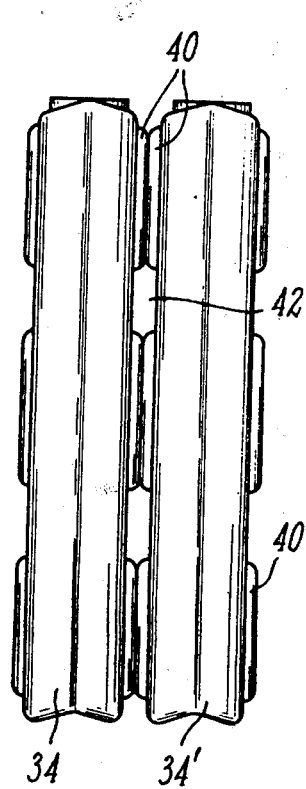
Figure 4:
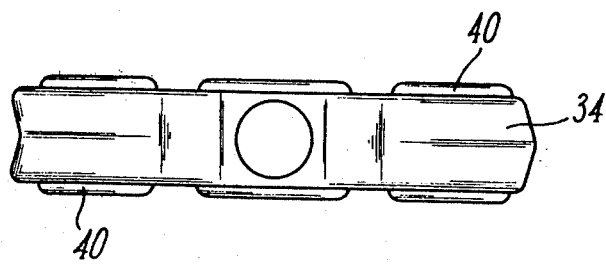

FIGS. 3, 4 and 5 illustrate a typical embodiment of an elementary container 34. More particularly, this container 34 comprises a rectangular parallellepipedic body made of suitable deformable material (such as metal or polyethylene), having a plurality of embossed areas such as 40 formed thereon so that, when stacked, the containers provide between them a free gap 42 (FIG. 5) permitting a free circulation of heat or cold carrier medium. The elementary containers are filled with a suitable medium for the storage of heat or cold energy having a high melting latent-heat. For this purpose, hydrated salts, and more particularly caustic soda, or even water, may be used.

Preferably, the cubic capacity of these elementary containers 34 is relatively low, for example of the order of two liters, in order to minimize the detrimental consequence of leaks.

According to a specific feature characterizing this invention, a plate 44 of synthetic foam, such as highly compressible polyurethane, is interposed between the stacks of elementary containers 34 enclosed in the exchanger-storage main container 10 and the inner wall of this container 10, in order properly to hold the elementary containers 34 in position therein. According to a further feature of this invention, each row or series of rows of elementary containers 34 may be isolated from the adjacent row or series by using a polyethylene sheet, so that possible convection currents, tending to reduce the volume drained by the carrier medium into the exchanger 10, are safely avoided.

The above-described device constitutes a plate exchanger and storage assembly having a very good filling coefficient (in excess of 75 percent), wherein the primary consists of the heat and/or cold carrier medium flowing through chambers 14 and 16, for example water, which is utilized either for charging the exchanger and storage unit or for discharging it, according to the sense of the temperature discrepancies. In fact, this medium departs from the crystallization temperatures of the medium contained in the elementary containers 34, and, according to whether this difference is positive or negative, the exchanger and/or storage unit is charged (crystallization) or discharged (melting). With this type of exchanger, it is possible to have a very great surface area for exchange purposes in relation to the volume of the storage medium kept in the elementary containers. In fact, this surface area is of the order of one square meter for 10 to 15 liters of storage product.

The discharge power of this exchanger and storage unit may be considerably greater than its charge power, the ratio R of the discharge power to the charge power being defined by the following formula:

$$R = \frac{P_D}{P_C} = \frac{\Delta tD(es)}{\Delta tC(es)} \times \frac{\log \frac{teC - t}{tsC - T}}{\log \frac{teD - T}{tsD - T}}$$

wherein:
$P_D$ is the discharge power;
$P_C$ is the charge power;
$\Delta tD(es)$ is the (input/output) temperature difference during discharge;
$\Delta tC(es)$ is the (input/output) temperature difference during charge;
teC is the input temperature during charge;
tsC is the output temperature during charge;
teD is the input temperature during discharge;
tsD is the output temperature during discharge; and,
T is the storage temperature.

It is mentioned in the foregoing that the elementary containers consist of deformable material. In fact, it is known that, as a rule, during a change of state (crystallization-fusion), the density, and therefore the volume, are modified. Thus, these variations are absorbed by the deformable envelope of containers 34. In the specific case of water undergoing a volume increment of the order of nine percent during crystallization, the problem arising from this increment is solved by maintaining in the elementary containers an air pocket producing an expansion inherent to the exchanger and/or storage unit. Thus, the expansion necessary for the carrier medium circuit is reduced within reasonable limits. On the other hand, the state of charge of the exchanger-storage assembly (storage state) can be ascertained by measuring the residual pressure of the carrier medium network. Moreover, by controlling the carrier medium pressure, it is possible to control the ice melting in the case of water, thus keeping at a constant value the free gaps between the elementary containers 34.

Of course, the present invention should not be construed as being strictly limited by the specific embodiment described and illustrated herein, since it also covers all variants thereof.

Thus, notably, the elementary containers may have any desired and suitable configuration, provided however that they meet the following requirements:

the ratio of the external exchange surface area to the volume should meet the exchange requirements, i.e. about one square meter of exchange surface for every 10 liters;

the use of deformable construction material, so that volume variations resulting from crystallization can safely be absorbed; and, the possibility of constituting homogeneous stacks, so that the carrier medium will face a homogeneous flow resistance to eliminate any non-drained areas during charge and discharge periods.

Figure 7:
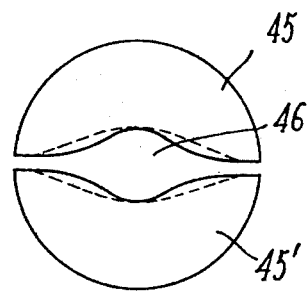

FIG. 7 illustrates a modified embodiment of an elementary container consisting of two semi-spherical bodies 45 and 45' which, when assembled, permit the circulation of carrier medium externally of the sphere thus formed, and also between these semi-spherical bodies through the gap 46.

With this substantially spherical configuration, the elementary containers are self-stacking in the main cylindrical container 10, and, in addition, it affords the above-defined exchange-surface area to volume ratio. Finally, the cross-sectional contour of the sphere is pre-shaped so that:

the exchange currents are not too remote from the core to be crystallized;

the volume variations due to the crystallization are absorbed by this cross-sectional contour without any external distortion of the sphere (dotted line portions of FIG. 7).

What I claim is:

1. A heat or cold exchanger and storage device operable according to the melting latent heat effect, said device comprising:

an elongated main container divided into two halves by a longitudinal partition to create two chambers connected at one end of said main container;

a plurality of elementary containers stacked in said two chambers in a manner such that a heat carrier medium circulated through said chambers will pass around said elementary containers and will meet a homogeneous resistance;

each said elementary container comprising a pair of semi-spherical elements so shaped such that when assembled there will be a gap therebetween permitting circulation therethrough of the heat carrier medium;

each said element being filled with a heat and/or cold storage medium capable of generating a substantial quantity of heat when melting;

each said element being formed of a deformable material capable of absorbing volumetric variations resulting from crystallization; and each said element containing therein an air pocket to produce an expansion inherent to the device.

2. A device as claimed in claim 1, wherein the ratio of the external surface area to the volume of each said elementary container is approximately one square meter of surface area for ten liters of volume.

3. A device as claimed in claim 1, further comprising, within said main container and located at each end thereof, a perforated plate having apertures sufficient to convert static pressure of the heat carrier medium into dynamic pressure as it penetrates into said chambers, thus affording a homogeneous distribution of said heat carrier medium throughout the device.

4. A device as claimed in claim 1, wherein said deformable material comprises polyethylene.

5. A device as claimed in claim 1, wherein said deformable material comprises polypropylene.

6. A device as claimed in claim 1, wherein said deformable material comprises a metal.

7. A device as claimed in claim 1, wherein said main container has a cylindrical configuration.

* * * * *